United States Patent [19]

Tsai

[11] Patent Number: 5,761,098
[45] Date of Patent: Jun. 2, 1998

[54] NOTEBOOK COMPUTER WITH INFRARED TRANSMITTER UNIT FOR TRANSMITTING DATA TO A COMPUTER PERIPHERAL DEVICE

[76] Inventor: Kun-Ming Tsai, No. 141, Lane 351, Sec. 1, Tai-Ping Rd.., Tsao-Tun Chen, Nan-Tou Hsien, Taiwan

[21] Appl. No.: 614,111

[22] Filed: Mar. 12, 1996

[51] Int. Cl.⁶ .................................................. G06F 1/16
[52] U.S. Cl. .......................... 364/710.13; 364/708.1
[58] Field of Search ...................... 364/708.1, 710.13; 361/679, 681, 683; 345/169, 158, 175, 901, 905

[56] References Cited

U.S. PATENT DOCUMENTS 5,666,497  9/1997  Milhaupt et al. ................... 361/686

*Primary Examiner*—Tan V. Mai
*Attorney, Agent, or Firm*—Skjerven, Morrill, MacPherson, Franklin & Friel; Alan H. MacPherson

[57] ABSTRACT

A notebook computer includes a keyboard housing, a monitor housing mounted pivotally on the keyboard housing, and an infrared transmitter unit which is adapted to transmit data to a computer peripheral device and which is installed on the monitor housing.

7 Claims, 10 Drawing Sheets

5,761,098

NOTEBOOK COMPUTER WITH INFRARED TRANSMITTER UNIT FOR TRANSMITTING DATA TO A COMPUTER PERIPHERAL DEVICE

BACKGROUND OF THE INVENTION

1. Field of the Invention

The invention relates to a notebook computer, more particularly to a notebook computer with an infrared transmitter unit for transmitting data to a computer peripheral device, such as a computer printer.

2. Description of the Related Art

FIG. 1 illustrates how communication between a conventional notebook computer 1 and a computer peripheral device, such as a computer printer 2, is established. As shown, a cable connector 3 interconnects the notebook computer 1 and the computer printer 2 to permit the transmission of data from the former to the latter. It is noted that the length, specification and quality of the cable connector 3 affects data transmission from the notebook computer 1 to the computer printer 2.

FIG. 2 illustrates another conventional notebook computer 4 which employs wireless communication for transmitting data to a computer printer 7. As shown, the notebook computer 4 is provided with an infrared transmitter unit 5 which is installed on a keyboard housing 6 of the notebook computer 4. Usually, the notebook computer 4 and the computer printer 7 are placed on tables 9 that have the same height to ensure alignment between the infrared transmitter unit 5 and an infrared receiver unit 8 of the computer printer 7. The maximum transmission rate that can be achieved with the use of the infrared transmitter unit 5 is about 115.2 kilobits per second at a distance of 0 to 1 meter and at an effective angular scope of transmission of ±15°.

Referring to FIG. 3, when the computer printer 7 and the notebook computer 4 are placed on tables 9 having different heights, the infrared receiver unit 8 encounters some difficulty in receiving the data transmitted by the notebook computer 4 in view of the limited effective angular scope of transmission of the infrared transmitter unit 5. In addition, even if the computer printer 7 and the notebook computer 4 are placed on tables 9 that have the same height, alignment of the infrared transmitter unit 5 and the infrared receiver unit 8 cannot be ensured due to the different standards employed by computer manufacturers.

SUMMARY OF THE INVENTION

Therefore, the object of the present invention is to provide a notebook computer with an infrared transmitter unit for transmitting data to a computer peripheral device, the position of the infrared transmitter unit being adjustable with respect to the computer peripheral device to facilitate proper alignment between the infrared transmitter unit and an infrared receiver unit on the computer peripheral device.

Accordingly, the notebook computer of the present invention comprises a keyboard housing, a monitor housing mounted pivotally on the keyboard housing, and an infrared transmitter unit which is adapted to transmit data to a computer peripheral device and which is installed on the monitor housing. The infrared transmitter unit may be disposed on a top side of the monitor housing, on a rear side of the monitor housing, on a left side of the monitor housing, on a right side of the monitor housing, or on a front side of the monitor housing.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
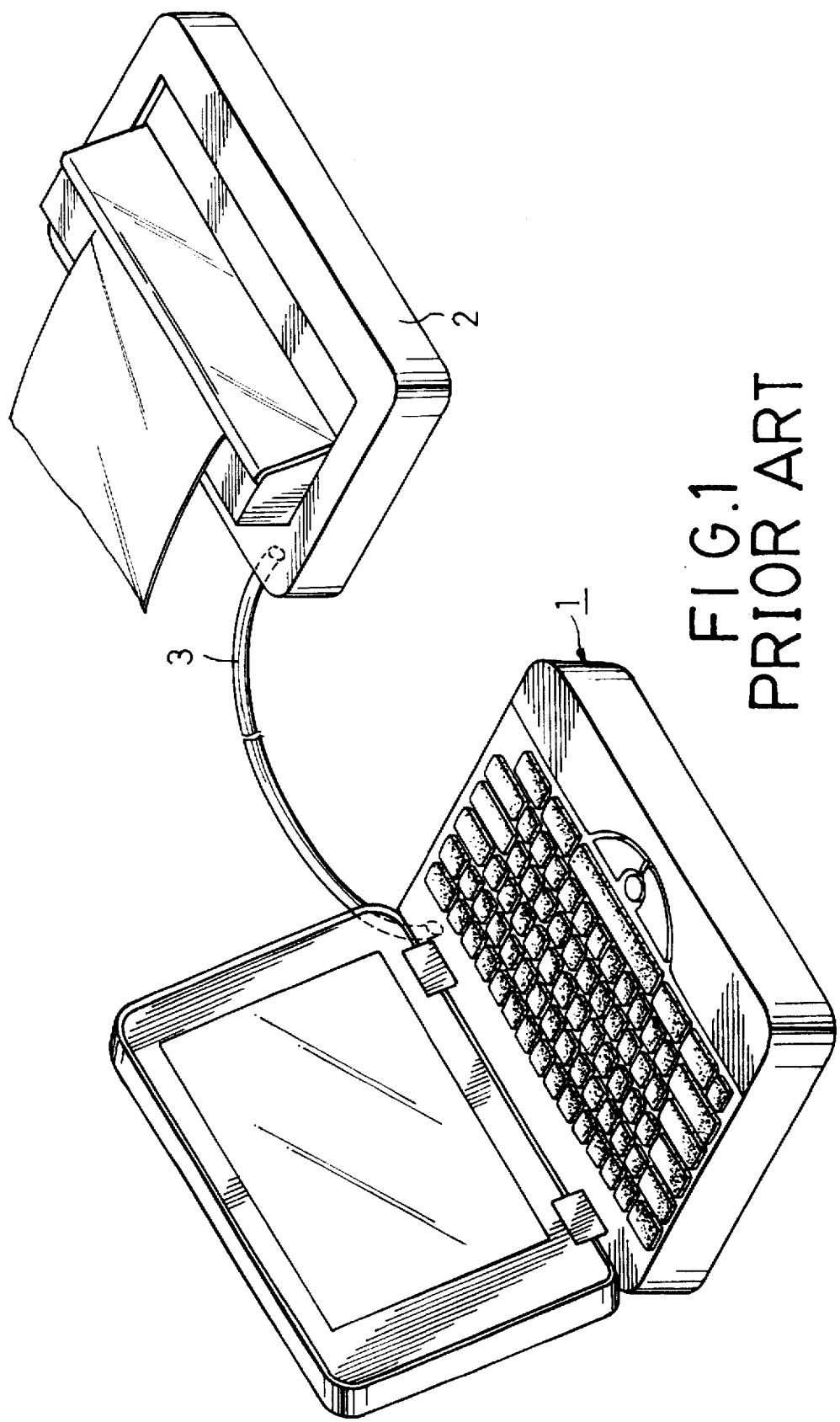
FIG. 1 illustrates how communication between a conventional notebook computer and a computer printer is established.
Figure 2:
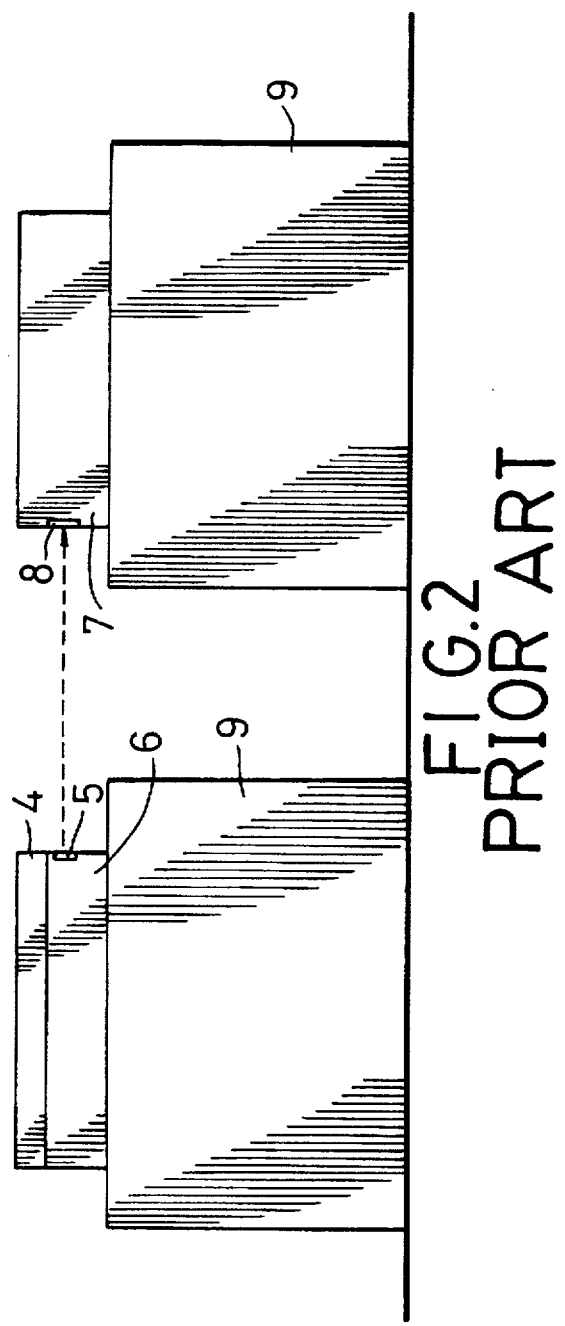
FIG. 2 illustrates how communication between another conventional notebook computer and a computer printer is established.
Figure 3:
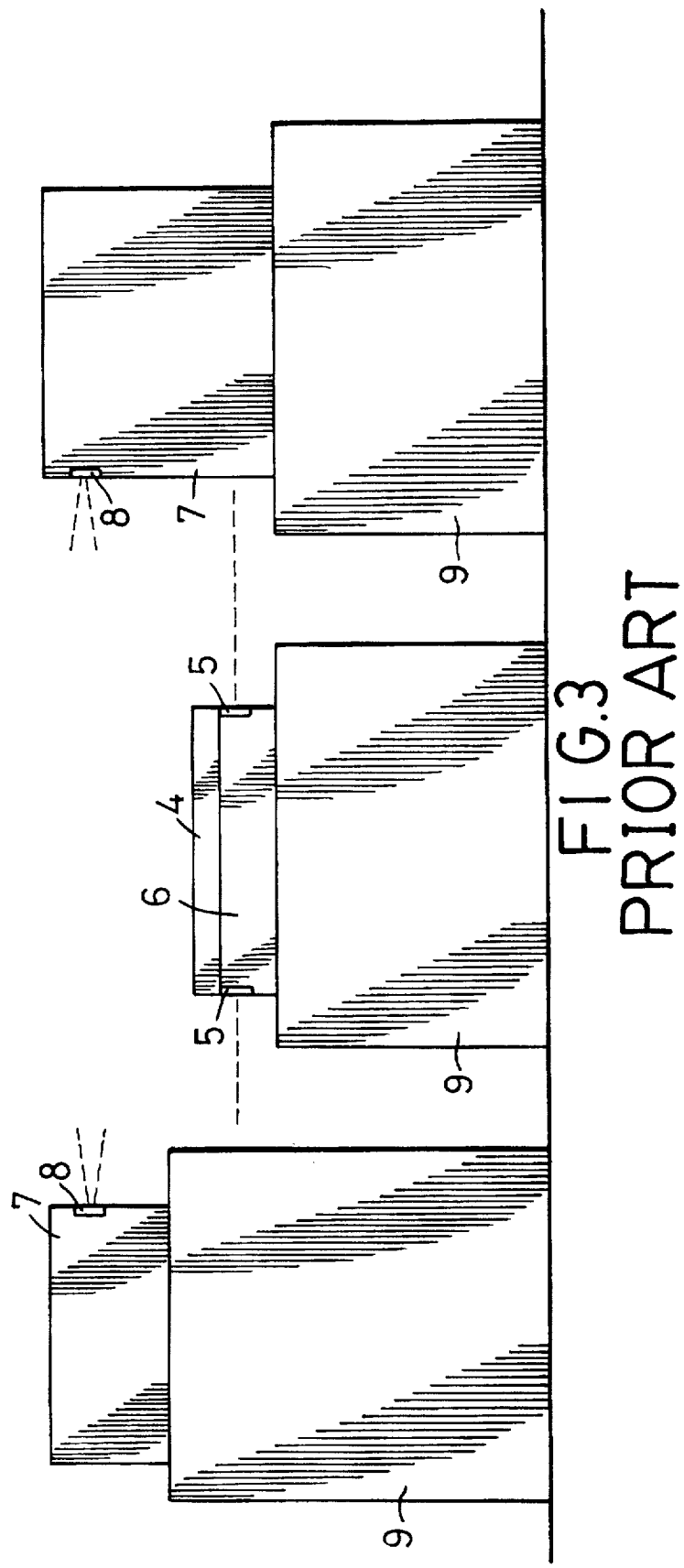
FIG. 3 illustrates the drawbacks of the conventional set-up shown in FIG. 2.

Before the present invention is described in greater detail, it should be noted that like elements are denoted by the same reference numerals throughout the disclosure.

Figure 4:
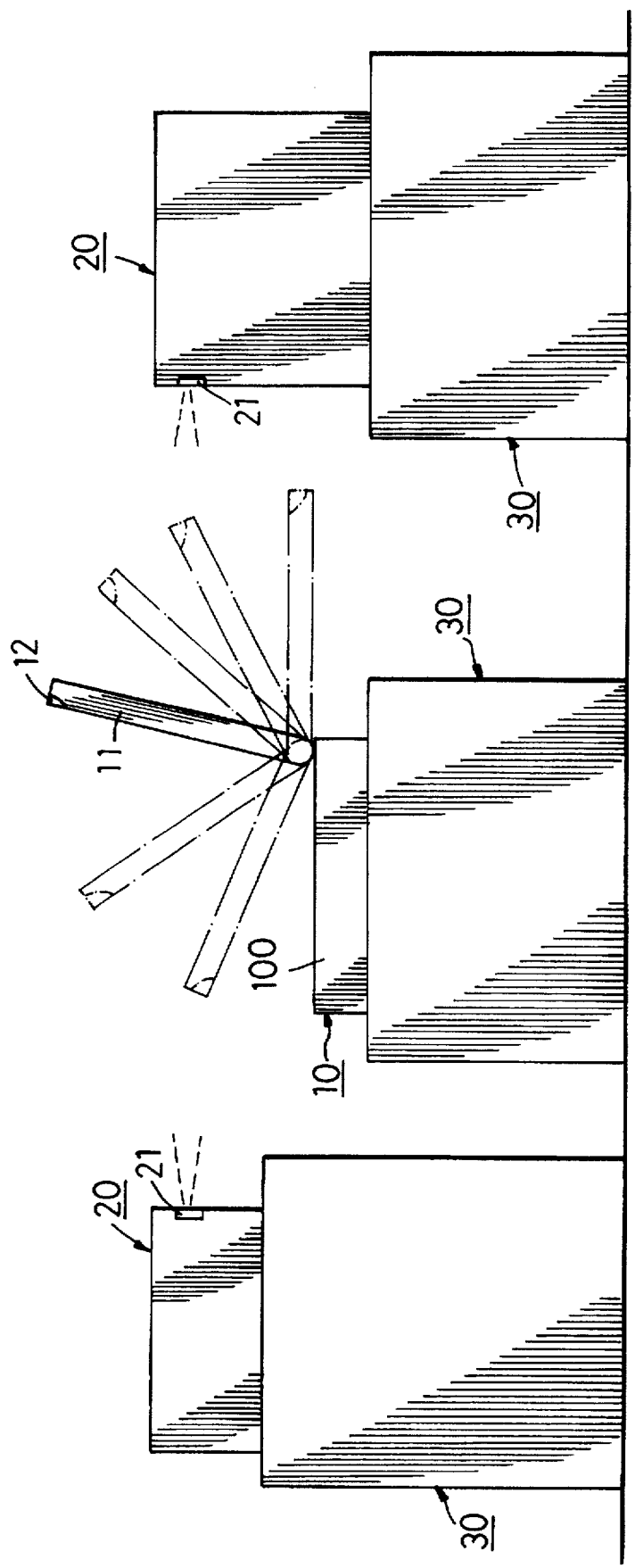
FIG. 4 is a schematic side view which illustrates the first preferred embodiment of a notebook computer according to the present invention when in use.

Referring to FIG. 4, the first preferred embodiment of a notebook computer 10 according to the present invention is shown to comprise a keyboard housing 100, a monitor housing 11 mounted pivotally on the keyboard housing 100, and an infrared transmitter unit 12 which is adapted to transmit data from the notebook computer 100 to a computer peripheral device, such as a computer printer 20. In the present invention, the infrared transmitter unit 12 is provided on the monitor housing 11 instead of the keyboard housing 100 as taught in the conventional notebook computer 4 described beforehand. In this embodiment, the infrared transmitter unit 12 is disposed on a top side of the monitor housing 11. Thus, by merely varying the angle of inclination of the monitor housing 11 with respect to the keyboard housing 100 during printing, the infrared transmitter unit 12 can be easily aligned with an infrared receiver unit 21 of the computer printer 20 even though the notebook computer 10 and the computer printer 20 are placed on tables 30 having different heights.

Figure 5:
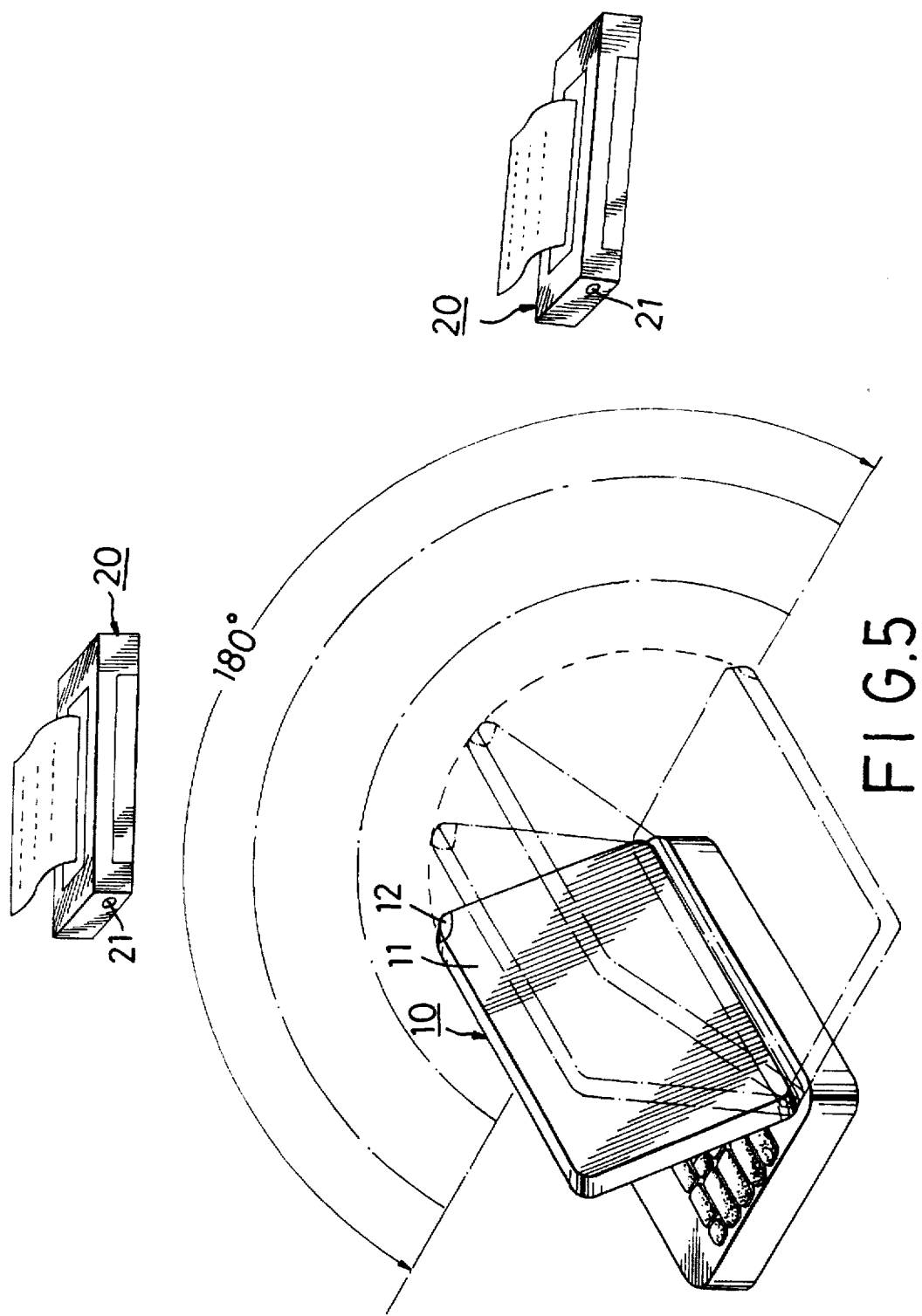
FIG. 5 is a perspective view which illustrates the second preferred embodiment of a notebook computer according to the present invention when in use.

FIG. 5 illustrates the second preferred embodiment of a notebook computer 10 according to the present invention when in use. Unlike the previous embodiment, the infrared transmitter unit 12 is disposed on an upper left hand corner of a rear side of the monitor housing 11. As with the first preferred embodiment, the monitor housing 11 can be pivoted within a 180° range to align the infrared transmitter unit 12 with the infrared receiver unit 21 on the computer printer 20.

Figure 6:
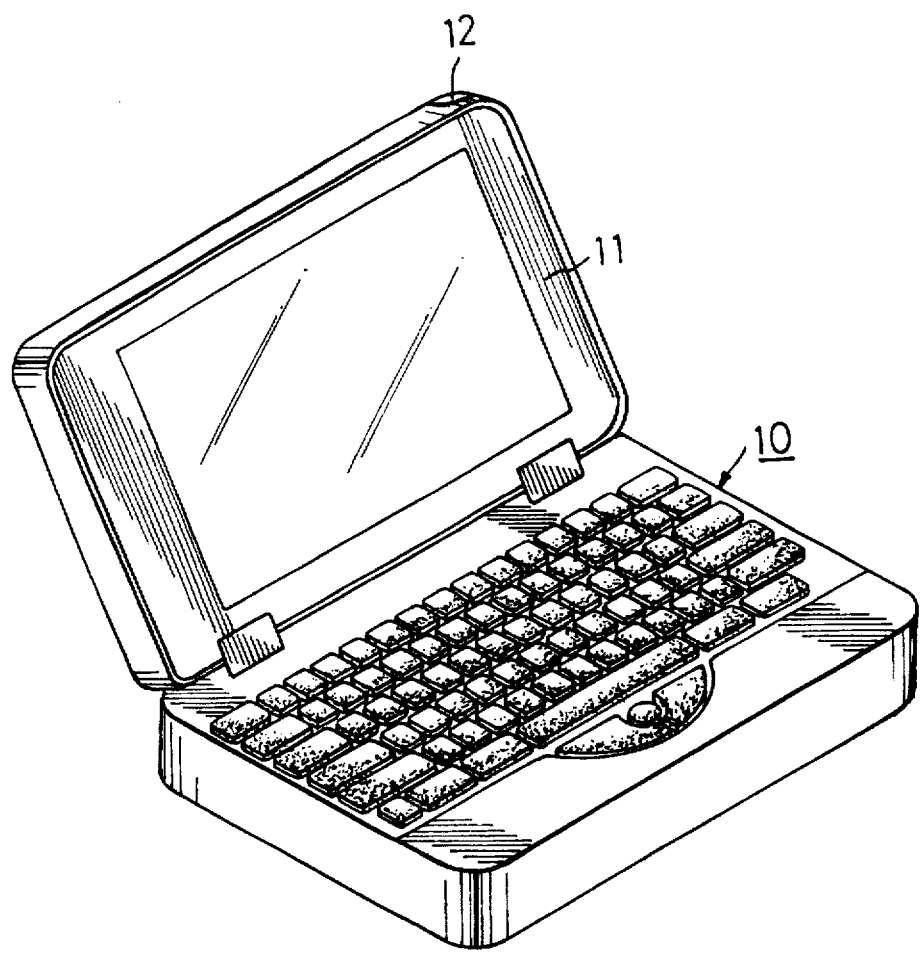
FIG. 6 is a perspective view of the third preferred embodiment of a notebook computer according to the present invention.

FIG. 6 illustrates the third preferred embodiment of a notebook computer 10 according to the present invention. Unlike the previous embodiments, the infrared transmitter unit 12 is disposed on an upper right hand corner of a rear side of the monitor housing 11. The operation of this embodiment is similar to that of the previous embodiments and will not be detailed further.

Figure 7:
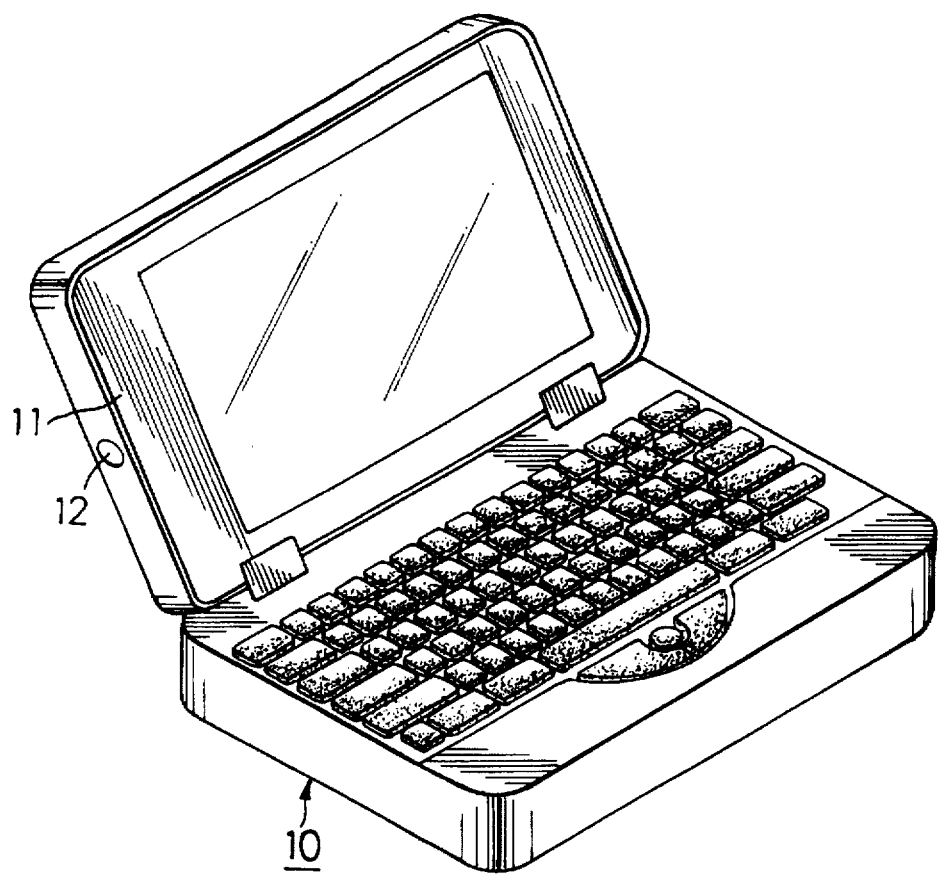
FIG. 7 is a perspective view of the fourth preferred embodiment of a notebook computer according to the present invention.

FIG. 7 illustrates the fourth preferred embodiment of a notebook computer 10 according to the present invention. Unlike the previous embodiments, the infrared transmitter unit 12 is disposed on a left side of the monitor housing 11. The operation of this embodiment is similar to that of the previous embodiments and will not be detailed further.

Figure 8:
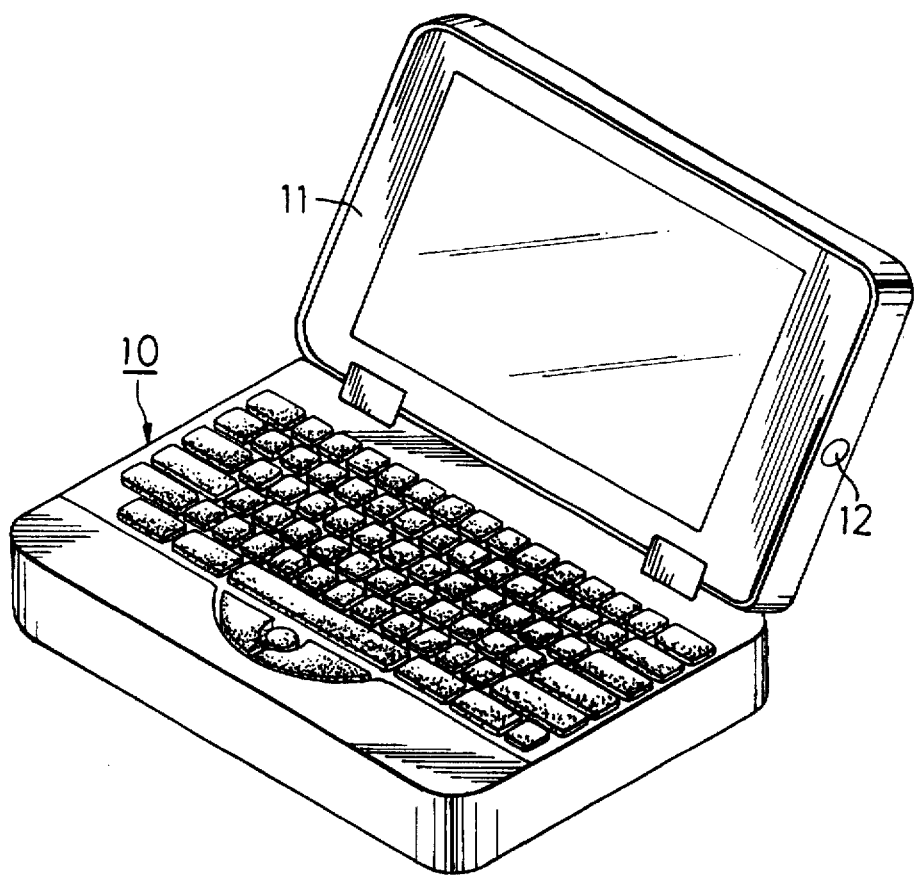
FIG. 8 is a perspective view of the fifth preferred embodiment of a notebook computer according to the present invention.

FIG. 8 illustrates the fifth preferred embodiment of a notebook computer 10 according to the present invention. Unlike the previous embodiments, the infrared transmitter unit 12 is disposed on a right side of the monitor housing 11. The operation of this embodiment is similar to that of the previous embodiments and will not be detailed further.

Figure 9:
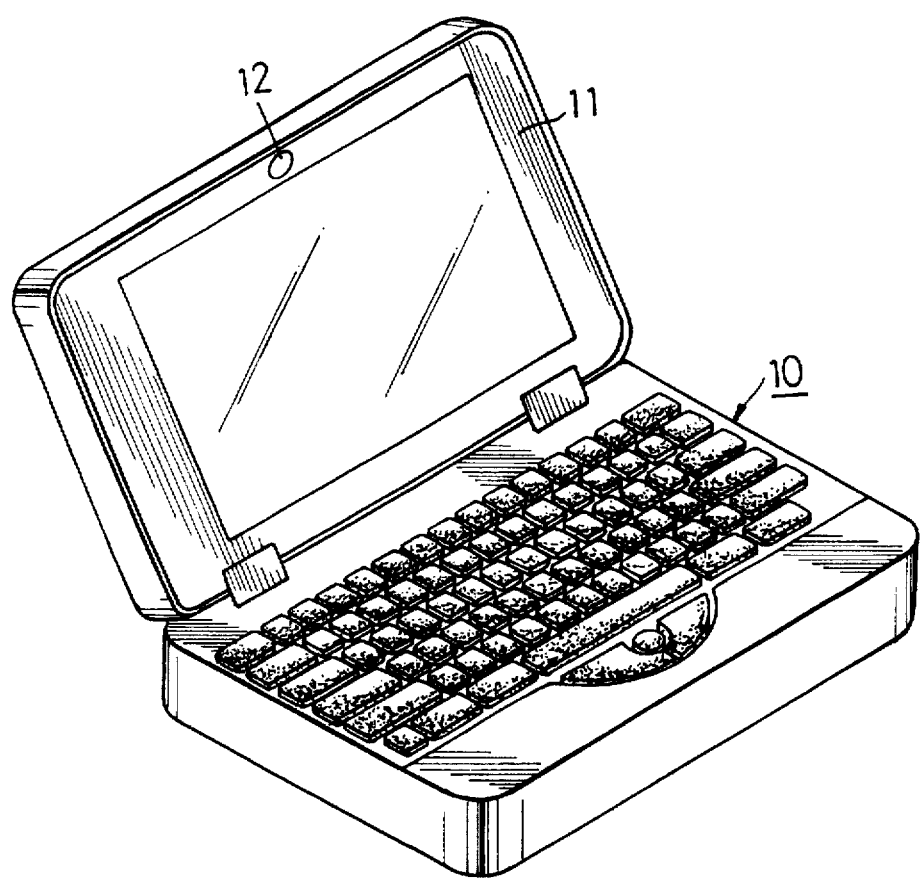
FIG. 9 is a perspective view of the sixth preferred embodiment of a notebook computer according to the present invention.

FIG. 9 illustrates the sixth preferred embodiment of a notebook computer 10 according to the present invention. Unlike the previous embodiments, the infrared transmitter unit 12 is disposed on a top portion of a front side of the monitor housing 11. The operation of this embodiment is similar to that of the previous embodiments and will not be detailed further.

Figure 10:
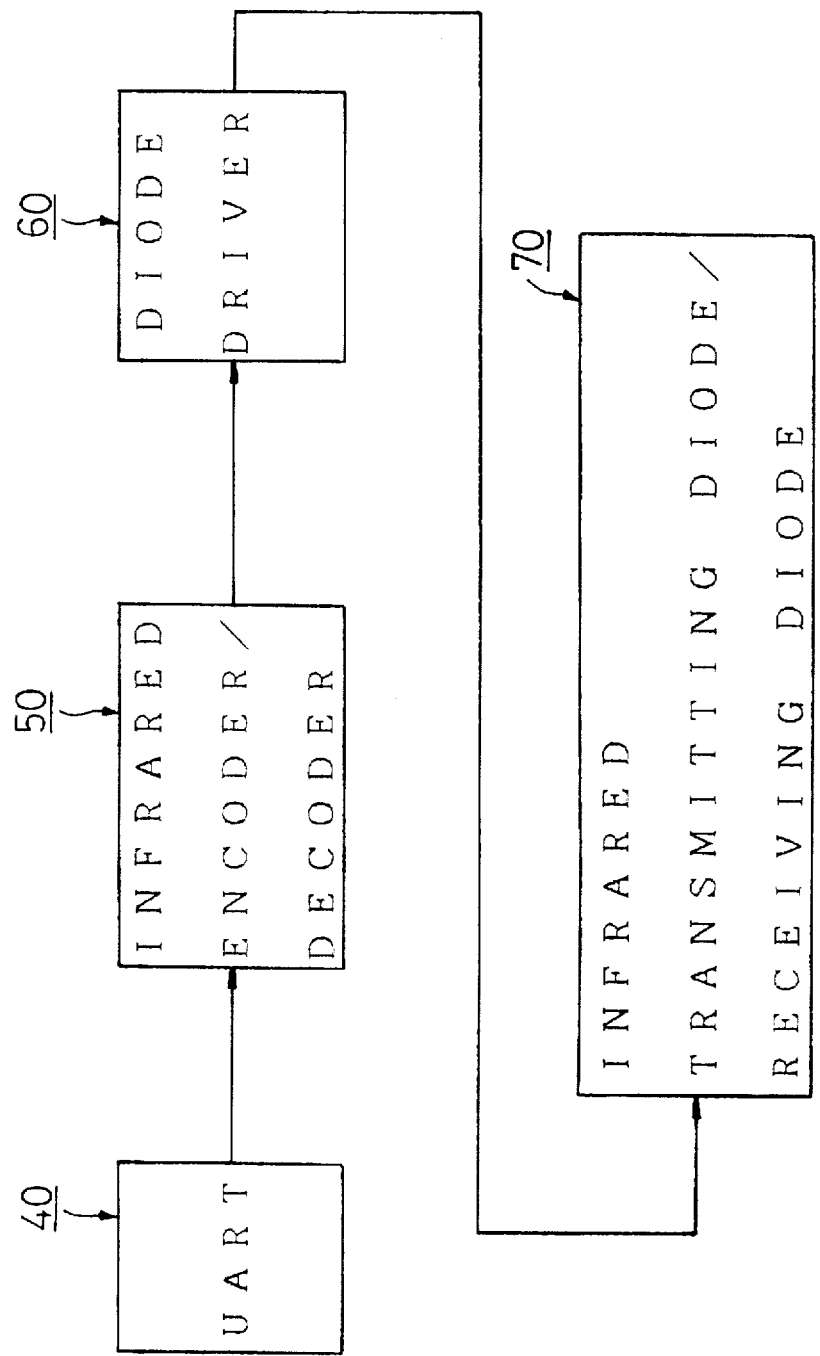
FIG. 10 is a schematic circuit block diagram of an infrared transmitter unit of the notebook computer of the present invention.

Referring to FIG. 10, the infrared transmitter unit 12 of the notebook computer 10 of the present invention is shown to comprise a universal asynchronous receiver/transmitter (UART) 40, an infrared encoder/decoder 50, a diode driver 60, and an infrared transmitting diode/receiving diode 70. The UART 40 converts data in a parallel format to a serial format. The encoder/decoder 50 is capable of converting the serial output of the UART 40 into infrared transmission format and vice versa. The diode driver 60 is capable of converting the output of the encoder/decoder 50 into diode driving signals, and signals received by the infrared transmitting diode/receiving diode 70 into CMOS pulse signals. Finally, the infrared transmitting diode/receiving diode 70 is capable of transmitting and receiving infrared signals.

The advantages and characterizing features of the notebook computer 10 of the present invention are as follows:

In the conventional notebook computer 4 described beforehand, the infrared transmitter unit 5 is provided on the keyboard housing 6. In order to establish proper communication between the notebook computer 4 and the computer printer 6, the infrared transmitter unit 5 must be aligned with the infrared receiver unit 8. However, in actual practice, differences in the height, angle and direction of the notebook computer 4 and the computer printer 6 hinder proper alignment between the infrared transmitter unit 5 and the infrared receiver unit 8. Thus, there is a need to raise the level of the infrared transmitter unit 5 to that of the infrared receiver unit 8 to permit data transmission between the notebook computer 4 and the computer printer 6, thereby resulting in inconvenience during printing.

In the notebook computer 10 of the present invention, the infrared transmitter unit 12 is provided on the monitor housing 11 so that proper alignment between the infrared transmitter unit 12 and the infrared receiver unit 21 on the computer printer 20 can be achieved, regardless of differences in the height, angle and direction of the notebook computer 10 and the computer printer 20, by merely pivoting the monitor housing 11 with respect to the keyboard housing 100. This results in added convenience during printing.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A notebook computer comprising a keyboard housing, a monitor housing mounted pivotally on said keyboard housing, and an infrared transmitter unit which is adapted to transmit data to a computer peripheral device and which is installed on said monitor housing.

2. The notebook computer as claimed in claim 1, wherein said infrared transmitter unit is disposed on a top side of said monitor housing.

3. The notebook computer as claimed in claim 1, wherein said infrared transmitter unit is disposed on a rear side of said monitor housing.

4. The notebook computer as claimed in claim 1, wherein said infrared transmitter unit is disposed on a left side of said monitor housing.

5. The notebook computer as claimed in claim 1, wherein said infrared transmitter unit is disposed on a right side of said monitor housing.

6. The notebook computer as claimed in claim 1, wherein said infrared transmitter unit is disposed on a front side of said monitor housing.

7. The notebook computer as claimed in claim 1, wherein the computer peripheral device is a computer printer.

* * * * *